2,925,398
Patented Feb. 16, 1960

2,925,398
COMPOSITION COMPRISING SOLID POLYOLEFIN AND A HYDROGENATED POLYPHENYL

Aubert Y. Coran, Brentwood, and Helmut L. Merten, Glendale, Mo., assignors to Monsanto Chemical Company, St. Louis, Mo., a corporation of Delaware No Drawing. Application February 11, 1957
Serial No. 639,179

8 Claims. (Cl. 260—33.6)

This invention relates to new and improved olefin polymer compositions. While the invention relates particularly to polyethylene compositions, it also relates to other olefin polymer compositions, which are hereinafter described in greater detail.

It was known heretofore that ethylene polymers, upon prolonged exposure to sunlight, underwent oxidation and photo-degradation reactions which resulted in chemical modifications of the polymeric molecule with a corresponding loss of tensile strength and elongation. To protect such olefin polymers from this degradation, various substances have been added to the polymers during their processing, but as is frequently the case, these added substances tend to have an undesirable effect on the other properties of the polymer. For example, many of these substances tend to impair the electrical properties of the polymer and produce undesirable color effects.

This invention has as an object the provision of new and useful compositions of matter comprising certain normally solid olefin polymers. A further object of this invention is to provide compositions comprising certain normally solid olefin polymers and, particularly, polyethylene compositions which have improved physical stability. Another object is to provide compositions comprising certain normally solid olefin polymers which, in the form of free films, molded articles, fibers, coatings, etc., are stabilized against degradation due to outdoor exposure. Another object is to provide novel normally solid polyolefin compositions which have improved melt viscosities. Other objects will appear hereinafter.

These and other objects are attained according to this invention by providing compositions comprising short chain mono-olefinic aliphatic hydrocarbon polymers and, as a modifier therefor, a polyphenyl which is at least partially (about 20%) hydrogenated (hereinafter sometimes referred to as the "H.P. modifier").

The term "polyphenyl," as used herein, shall be understood to refer to polyphenyls which contain at least three aromatic rings and preferably to terphenyls and quarterphenyls. The hydrogenated polyphenyls can be obtained, for example, by hydrogenating a mixture of isomeric polyphenyls and separating a particular isomer, or the hydrogenated mixture may be used as such. The novel compositions of this invention can be prepared in any suitable manner that will effect thorough and intimate mixing of the polymer and H.P. modifier. This can be accomplished in any machine suitable for mixing solids, as by milling a mixture of the olefin polymer and H.P. modifier on hot or cold mill rolls as the nature of the polymer permits, by mixing in Banbury mixers or other well-known devices of this nature. Instead of adding the H.P. modifier to the polymer in the solid or molten state, it can be added to a solution or suspension of the polymer in an organic solvent, which solution may then be employed for the formation of films, for wet or dry spinning of fibers, monofilaments, and the like. The H.P. modifier may be added as such or may first be dissolved in a suitable solvent as the particular mixing procedure warrants.

Through the use of the H.P. modifiers described herein, it has been found that normally solid olefin polymers can be stabilized against the effects of weather in the presence of strong sunlight. It has also been found that the difficulty often encountered in the extrusion or injection molding of such solid polymers due to high viscosity (low melt index), can be substantially decreased. These effects are achieved without the impairment of such other properties of polyethylene and other resinous polyolefins, as, for example, the color, electrical properties, etc.

In general, the amount of the H.P. modifier to be added will depend upon the result to be achieved, but usually the ultimate compositions do not contain more than a compatible amount of the H.P. modifier, i.e. not more than about 15 parts per hundred parts of the olefin polymer. For example, to achieve effective stabilization against the deleterious effects of weather, amounts of H.P. modifier in the range of 5 to 12 parts per hundred parts (phr.) of the olefin polymer may be added; whereas lower amounts, i.e. in the range of 2 to 5 parts, may be added to increase the melt index (lower the melt viscosity) of the olefin polymer. Compositions containing the modifier in amounts varying from 5 to 10 parts per hundred parts of the olefin polymer are preferred. Excellent results are obtained when the polymer composition contains approximately 10 phr. of the H.P. modifier. Concentrates which contain up to 50 phr. or more of the H.P. modifier can be prepared and stored and subsequently blended with additional quantities of the polymer to impart the desired properties thereto.

A suitable H.P. modifier for the purposes of this invention can be obtained by the hydrogenation of the high-boiling fraction of by-product hydrocarbons obtained from a commercial process for the preparation of biphenyl by the pyrolysis of benzene. In such a process, benzene is passed through heated tubes or through molten metals or molten salts. The main products formed are biphenyl, hydrogen, and a light-colored, waxy fraction of high-boiling hydrocarbons comprising a mixture of isomeric polyphenyls, which mixture boils at about 270° C. The partial (about 20%) to complete hydrogenation of this solid higher-boiling waxy fraction at a temperature within the range of 160° C. to 240° C., employing a hydrogenation catalyst such as nickel and a hydrogen pressure as low as 40 pounds per square inch, but preferably within the range of 200 to 1200 pounds per square inch, yields a mixture consisting essentially of hydrogenated terphenyls and hydrogenated quarterphenyls. A particular isomer may be obtained by the fractional distillation of this mixture or by separating the particular polyphenyl isomer from the solid higher-boiling waxy fraction starting material and subjecting it to the hydrogenation process.

A preferred material obtained by the above process is a clear, oily, high-boiling liquid mixture which is about 40% hydrogenated. This material has a specific gravity within the range of 1.05 to 0.970 at 25° C. and a refractive index ($n_D^{25}$) above about 1.54. It also has a power factor of less than 0.1% at 1000 cycles and 25° C., less than 0.5% at 60 cycles and 25° C., and a dielectric constant of 2.6 to 2.7 at 60 and 1000 cycles at 25° C. This material will be referred to hereinafter as "40% hydrogenated polyphenyls."

Still more preferred as a modifier is a completely hydrogenated mixture which is described as a white, wax-like semi-solid having a specific gravity of from about 0.9180 to 0.9230 at 50° C., a refractive index ($n_D^{50}$) of from about 1.4940 to 1.4985, and a boiling range of 170° C. to 270° C. at 10 mm. pressure. It also has a power factor of less than 0.03% at 1000 cycles and 25° C., less than 0.13% at 60 cycles and 25° C., and a dielectric constant of 2.2–2.3 at 60 and 1000 cycles and 25° C. This material, which is obtained by the complete hydrogenation of isomeric polyphenyls, will be hereinafter referred to by the term, "completely hydrogenated mixed polyphenyls."

The olefin polymers used in the composition of this invention can be any normally solid short-chain mono-olenfiic aliphatic hydrocarbon polymer, e.g., polymers of ethylene, propylene, isobutylene, etc., regardless of the process by which it is produced. For example, not only the commercial polyethylene currently produced by high-pressure processes, which is a low-density polymer, can be used, but also high-density ethylene polymers obtained from the newer low-pressure processes, such as the proprietary materials, "Marlex," "Marlex 50," etc., produced by the so-called Phillips process (Phillips Petroleum Company), the so-called Ziegler polymers produced by the Ziegler process, and other low-pressure processes wherein the so-called Ziegler-type catalysts are used.

The short chain mono-olefinic aliphatic hydrocarbon polymers used in the composition of this invention may be copolymers of two or more of the aforementioned short chain mono-olefinic aliphatic hydrocarbon monomers, especially copolymers of ethylene with minor amounts (from 2 to 10 percent) of higher olefins such as propylene or butylene, and copolymers of one or more short chain mono-olefinic aliphatic hydrocarbon monomers with minor proportions, not to exceed 15% by weight of the olefin, of other ethylenically-unsaturated comonomers such as styrene, vinyl chloride, vinyl acetate, vinyl methyl ether, vinylidene chlorofluoride, methyl methacrylate.

The olefin polymers to which the present invention is applicable must have molecular weights sufficiently high to be normally solid at room temperatures, i.e., above about 5000; preferably, the olefin polymers will have even higher molecular weights, e.g., 20,000 and above. The molecular weights in question are those calculated in the conventional manner on the basis of the viscosity of the polymer in solution, as described in J.A.C.S. 73, page 1901 (1951).

The compositions of this invention are not only useful in applications where stability to the effects of light and weather is needed, but also in other applications where the tensile strength and elongation properties are important. In addition, compositions prepared from the low-density type polyethylenes and the H.P. modifier retain the high electrical insulating properties of the polyethylene itself.

As is evident from the results obtained in Examples 3, 4, and 5, plasticizing effects are obtained without adversely affecting the color of the polymer. The slightly softer product permits injection molding at lower temperatures than those normally used for the polymer itself. Since the flexibility of a polyethylene is increased without a corresponding impairment of tensile strength, numerous other applications become apparent.

Although the compositions of this invention are composed essentially of olefin polymers and hydrogenated polyphenyl, small amounts of other materials can also be added. These materials include, for example, fillers, compatible resins, pigments, dyes, lubricants, antistatic agents, and antioxidants which can be added to modify the compositions for a particular application.

The following examples, in which all parts are by weight unless otherwise specified, more fully illustrate the nature of the invention; however, the specific details of these examples are not to be taken as limitations upon the invention.

EXAMPLE 1.—PREPARATION OF THIN FILM

Pellets of DYNH polyethylene (which material has an average molecular weight of about 21,000 and is manufactured by the Bakelite Division of Carbide and Carbon Chemical Company) were mixed with xylene to provide a solution containing 20% polyethylene. The solution was then heated to 130° C. with agitation until complete solution was effected. This solution was divided into four portions; one was used as a control, and there were dissolved in the other three portions, amounts of completely hydrogenated mixed polyphenyls (hereinafter referred to as Modifier A), having a refractive ($n_D^{50}$) of 1.4982, such that the final solutions contained, respectively, 5, 10, and 15 parts of Modifier A per 100 parts of polyethylene. Each solution was allowed to stand until all air bubbles disappeared and was then cast over a glass plate, previously heated to 130° C., to form, in each case, a film approximately 20 mils thick. The film in each case was then air dried at 130° C. and cooled to room temperature. The dried films were removed from the glass plates and found to be about 4 mils thick.

EXAMPLE 2.—EFFECT OF OUTDOOR WEATHERING

The film samples prepared in Example 1 were simultaneously exposed to St. Louis County, Missouri, summer and fall weather for a period of 150 days. At the end of 100- and 150-day periods, disks two inches in diameter were cut from each film and tested for strength at break and maximum elongation. The results of these tests are set out in Tables A and B, below.

*Table A*

EFFECT OF EXPOSURE ON TENSILE STRENGTH

| Parts of Modifier A Per 100 Parts of Polyethylene | Tensile Strength, p.s.i. | | |
|---|---|---|---|
| | Initial | 100 Days | 150 Days |
| 0 | 2,000 | 1,350 | 1,850 |
| 5 | 2,000 | 1,700 | 2,050 |
| 10 | 2,000 | 2,000 | 2,300 |
| 15 [1] | 2,000 | 2,250 | 2,150 |

[1] Slight incompatibility.

*Table B*

EFFECT OF EXPOSURE ON ELONGATION TO BREAK

| Parts of Modifier A Per 100 Parts of Polyethylene | Percent Elongation | | |
|---|---|---|---|
| | Initial | 100 Days | 150 Days |
| 0 | 600 | 120 | 35 |
| 5 | 650 | 600 | 600 |
| 10 | 700 | 650 | 650 |
| 15 [1] | 600 | 800 | 730 |

[1] Slight incompatibility.

EXAMPLE 3.—EFFECT OF MODIFIER A ON MELT INDEX

High molecular weight (about 100,000) polyethylene produced by a low-pressure catalytic process and the polyethylene used in Example 1 were each blended on a hot (125–160° C.) two-roll differential speed mill with varying amounts of Modifier A to furnish homogeneous compositions. Each of the compositions was then chopped in granules and molded under heat (150° C.) and pressure (50 p.s.i.) into sheets about 40 mils thick. Test pieces of these sheets were then subjected to standard melt index test (A.S.T.M. D1238–52T) to determine the effect of the modifier on the melt index of the polymer. These results of these tests are reported in Table C, below.

*Table C*

| Parts of Modifier A Per 100 Parts of Polyethylene | Melt Index (gms./10 min. at 190° C.) | |
|---|---|---|
| | High Press. Type Polyethylene | Low Press. Type Polyethylene |
| 0 | 1.31 | 4.2 |
| 2.5 | 1.69 | |
| 5 | 2.24 | 5.3 |
| 10 | 3.50 | 7.3 |

EXAMPLE 4.—HARDNESS AND CLARITY

Test sheets of the compositions of this invention, using each type of polyethylene (as in Example 3), were prepared following the procedure of Example 3. Each sample was then subjected to a hardness test and an optical clarity test. The hardness test was conducted with a standard instrument made by the Shore Instrument Company. The hardness of the composition was determined by its resistance to the penetration of a standard needle under a standard load for a standard length of time, and was expressed in units of from 1 to 100. The clarity of the compositions was measured on a Photovolt Photoelectric Reflection Meter, Model 610, the results being expressed as percent reflectance (A.S.T.M. D-791-50). The proportions of polymer and Modifier A and the results of these tests are reported in Tables D and E, below.

Table D
HARDNESS

| Parts of Modifier A Per 100 Parts of Polyethylene | Shore Hardness (D-Scale—80 mil specimen for ten seconds) | |
|---|---|---|
| | High Press. Type Polyethylene | Low Press. Type Polyethylene |
| 0 | 43 | 58 |
| 5 | 40 | 56 |
| 10 | 38 | 54 |

Table E
CLARITY

| Parts of Modifier A Per 100 Parts of Polyethylene | Percent Reflectance | |
|---|---|---|
| | High Press. Type Polyethylene | Low Press. Type Polyethylene |
| 0 | 27 | 41 |
| 5 | 29 | 38 |
| 10 | 27 | 39 |

EXAMPLE 5.—PROPERTIES OF POLYETHYLENE MODIFIED WITH 40% HYDROGENATED POLYPHENYLS

Test sheets comprising each type of polyethylene (used in Example 3) were prepared according to the procedure of Example 3, containing 10 parts of 40% hydrogenated polyphenyls (Modifier B) per 100 parts of resin. The physical properties of the sheets so prepared were compared with the control samples, and the results are reported in Table F, below.

Table F

| Physical Property | "DYNH" Polyethylene | | Low Press. Type Polyethylene | |
|---|---|---|---|---|
| | Control | 10 phr. of Modifier B | Control | 10 phr. of Modifier B |
| Stress at Break (p.s.i.) | 2,000 | 1,700 | 2,000 | 1,600 |
| Maximum Elongation (Percent) | 600 | 750 | 180 | 160 |
| Modulus (p.s.i.) | 15,000 | 10,000 | 52,000 | 33,000 |
| Shore Hardness (D Scale) | 43 | 37 | 58 | 52 |

While this invention has been described with respect to certain embodiments, it is not so limited and it is to be understood that variations and modifications thereof obvious to those skilled in the art may be made without departing from the spirit or scope of this invention.

What is claimed is:

1. A composition comprising a major amount of a normally solid polymer of a mono-olefinic aliphatic hydrocarbon monomer having from two to four carbon atoms, and a minor amount, at least about 1 part by weight per hundred parts by weight of polymer, of polyphenyl, which is at least 20% hydrogenated and contains from three to four rings.

2. A composition comprising a major amount of a normally solid copolymer of ethylene with from 2 to 10 percent by weight of the ethylene of an olefin selected from the group consisting of propylene and butylene and a minor amount, at least about one part by weight per hundred parts of polymer, of polyphenyl which is at least 20% hydrogenated and contains three to four rings.

3. A composition comprising a major amount of a normally solid homopolymer of ethylene and a minor amount, at least 1 part by weight per hundred parts of polyethylene, of polyphenyl which is at least 20% hydrogenated and contains three to four rings.

4. A composition comprising a major amount of a normally solid homopolymer of ethylene and a minor amount, at least 1 part by weight per hundred parts of polyethylene, of completely hydrogenated polyphenyl and contains three to four rings.

5. A composition comprising a major amount of a normally solid homopolymer of ethylene and a minor amount, at least 1 part by weight per hundred parts of polyethylene, of 40% hydrogenated polyphenyl and contains three to four rings.

6. A composition comprising a normally solid homopolymer of ethylene and from about 1 to about 15 parts of polyphenyl per hundred parts of ethylene homopolymer, which polyphenyl is at least 20% hydrogenated and contains three to four rings.

7. A composition comprising a normally solid homopolymer of ethylene and from about 5 to about 10 parts of completely hydrogenated mixed polyphenyl per hundred parts of ethylene homopolymer, which polyphenyl contains three to four rings.

8. A composition comprising a normally solid homopolymer of ethylene and from about 5 to about 10 parts by weight of 40% hydrogenated polyphenyl per hundred parts of ethylene homopolymer, which polyphenyl contains three to four rings.

References Cited in the file of this patent

UNITED STATES PATENTS

| | | |
|---|---|---|
| 2,303,069 | Sparks et al. | Nov. 24, 1942 |
| 2,364,719 | Jenkins | Dec. 12, 1944 |
| 2,680,128 | Slocombe et al. | June 1, 1954 |